(12) United States Patent
Choi et al.

(10) Patent No.: US 7,206,840 B2
(45) Date of Patent: *Apr. 17, 2007

(54) DYNAMIC FREQUENCY SELECTION SCHEME FOR IEEE 802.11 WLANS

(75) Inventors: Sunghyun Choi, Montvale, NJ (US); Stefan Mangold, Aachen (DE); Amjad Soomro, Hopewell Junction, NY (US)

(73) Assignee: Koninklike Philips Electronics N.V., Eindhoven (NL)

( * ) Notice: Subject to any disclaimer, the term of this patent is extended or adjusted under 35 U.S.C. 154(b) by 879 days.

This patent is subject to a terminal disclaimer.

(21) Appl. No.: 09/976,339

(22) Filed: Oct. 12, 2001

(65) Prior Publication Data

US 2002/0188723 A1     Dec. 12, 2002

Related U.S. Application Data

(60) Provisional application No. 60/290,507, filed on May 11, 2001.

(51) Int. Cl.
    *G06F 15/173*     (2006.01)
(52) U.S. Cl. .................. 709/225; 370/333; 455/509
(58) Field of Classification Search ............. 455/452.1, 455/452.2, 450, 432.1, 436, 447, 455, 405, 455/434, 464, 226, 517; 370/333; 709/225
    See application file for complete search history.

(56) References Cited

U.S. PATENT DOCUMENTS

| | | | | |
|---|---|---|---|---|
| 5,335,356 A | * | 8/1994 | Andersson .................. 455/517 |
| 5,418,839 A | * | 5/1995 | Knuth et al. ................. 455/464 |
| 5,471,671 A | * | 11/1995 | Wang et al. ............. 455/226.2 |
| 6,023,622 A | | 3/1997 | Plaschke et al. ............. 455/452 |
| 5,673,307 A | * | 9/1997 | Holland et al. ............. 455/436 |
| 5,778,316 A | * | 7/1998 | Persson et al. ............. 455/434 |
| 5,862,451 A | * | 1/1999 | Grau et al. .................. 725/116 |
| 6,112,098 A | * | 8/2000 | Flint et al. .................. 455/464 |
| 6,169,761 B1 | * | 1/2001 | Marcoccia et al. ......... 375/132 |
| 6,456,848 B1 | * | 9/2002 | Freeman et al. ............ 455/450 |
| 6,516,189 B1 | * | 2/2003 | Frangione et al. .......... 455/405 |
| 6,597,680 B1 | * | 7/2003 | Lindskog et al. ........... 370/347 |
| 6,694,138 B1 | * | 2/2004 | Kobylinski et al. ......... 455/437 |
| 6,792,284 B1 | * | 9/2004 | Dalsgaard et al. .......... 455/525 |

(Continued)

OTHER PUBLICATIONS

Justin C.-1 Chuang, "Performance Issues and Algorithms for Dynamic Channel Assignment", Aug. 1993, IEEE Journal of Selected Areas in Commuincations.*

(Continued)

Primary Examiner—Thong Vu
(74) Attorney, Agent, or Firm—Larry Liberchuk

(57) ABSTRACT

Disclosed is a method and system for dynamically selecting a communication channel between an access point (AP) and a plurality of stations (STAs) in an IEEE 802.11 wireless local area network (WLAN). The method includes the steps of: determining whether a new channel to be used by the plurality of STAs is needed; measuring the channel quality of a plurality of frequency channels by at least one of the plurality of STAs; reporting the quality of the plurality of frequency channels in terms of a received signal strength indication (RSSI), Clear Channel Assessment (CCA) busy periods and periodicity; and, selecting one of the candidate channels based on the channel quality report for use in communication between the AP and the plurality of STAs.

25 Claims, 8 Drawing Sheets

U.S. PATENT DOCUMENTS

| | | | |
|---|---|---|---|
| 6,868,277 B1* | 3/2005 | Cerwall et al. | 455/509 |
| 6,985,465 B2* | 1/2006 | Cervello et al. | 370/333 |
| 2001/0028638 A1* | 10/2001 | Walton et al. | 370/335 |
| 2001/0053139 A1* | 12/2001 | Zimmermann et al. | 370/332 |

OTHER PUBLICATIONS

HIPERLAN channel assignment strategies, Jones, B.C.; Skellem, D.J.; Electronics Letters, vol. 33, Issue 13, Jun. 19, 1997 pp. 1116-1117.*

Enhancing throughput over wireless LANs using . . . -Bhagwat (1996) ftp.ccs.neu.edu/pub/people/matta/Wireless/PravinInfo96.ps.*

Adaptive Resource Reservation for Indoor Wireless LANs—Lu, Srikant, Bharghavan (1996) timely.crhc.uiuc.edu/Papers/globecomm96.ps.gz.*

Performance Evaluation of Distributed Co-Ordination..—Khurana, Kahol.. (1999) www.cs.colostate.edu/~gupta/mascot99.ps.gz.*

S. Choi et al; "Transmitter Power Control (TPC) and Dynamic Frequency Selection (DFS) Joint Proposal for 802.11h WLAN", IEEE 802.11-01/169, xx,xx, Mar. 12, 2001, pp. 1-16, XP002213584.

G. Cervello et al; "Dynamic Channel Sdelection (DCS) Scheme for 802.11", IEEE 802.11-00/195, XX, XX, Jul. 12, 2000, pp. 1-7, XP002213585.

* cited by examiner

| OCTETS: 1 | 1 | 1 | 1 | 0-2300 |
|---|---|---|---|---|
| CATEGORY CODE (4) | ACTION CODE (0 OR 2n, I.E., ANY EVEN NUMBER) | ACTIVATION DELAY | DIALOG TOKEN | CHANNEL MEASUREMENT METHOD ELEMENT |

FIG. 4

| OCTETS: 1 | 1 | 2 | 1 - n | 2 |
|---|---|---|---|---|
| ELEMENT ID (33) | LENGTH (5 - n+4) | MEASUREMENT DURATION | CHANNEL NUMBERS | REPORT TIME LIMIT |

FIG. 5(a)

| OCTETS: 1 | 1 | 2 | 1 | 1 | 1-n | 2 |
|---|---|---|---|---|---|---|
| ELEMENT ID (34) | LENGTH (7 - n+6) | MEASUREMENT DURATION | MEASUREMENT OFFSET | NON-MEASUREMENT DURATION | CHANNEL NUMBERS | REPORT TIME LIMIT |

FIG. 5(b)

| OCTETS: 1 | 1 | 1 | 1 | 0-2300 |
|---|---|---|---|---|
| CATEGORY CODE (4) | ACTION CODE (1 OR 2n+1 FROM THE DEFINITION OF THE REQUEST FRAME) | ACTION-SPECIFIC STATUS | DIALOG TOKEN | CHANNEL MEASUREMENT REPORT ELEMENT |

FIG. 6(a)

| OCTETS: 1 | 1 | 1 | 1 |
|---|---|---|---|
| ELEMENT ID (35) | LENGTH (2 - 2 + 10*n) | OWN AP TRANSMITTED POWER | OWN CHANNEL RECEIVED SIGNAL STRENGTH |

| OCTETS: 1 | 1 | 1 | 1 | 2 | 4 |
|---|---|---|---|---|---|
| CHANNEL NUMBER 1 | MEASUREMENT SUMMARY | CCA BUSY FRACTION | CCA BUSY DURATION | CCA BUSY INTERVAL | RSSRI STATISTICS |

•••

•••

| OCTETS: 1 | 1 | 1 | 1 | 2 | 4 |
|---|---|---|---|---|---|
| CHANNEL NUMBER n | MEASUREMENT SUMMARY | CCA BUSY FRACTION | CCA BUSY DURATION | CCA BUSY INTERVAL | RSSRI STATISTICS |

FIG. 6(b)

| BITS: 1 | 1 | 1 | 1 | 1 | 1 | 1 | 1 |
|---|---|---|---|---|---|---|---|
| BSS | QBSS | PERIODICITY | BEACON | | TO DS | FROM DS | RES |

FIG. 6(c)

| RECEIVED SIGNAL STRENGTH INDICATOR (RSSI) | ENERGY OBSERVED AT THE ANTENNA (dBm) | TOLERANCE (dB) |
|---|---|---|
| $0 \leq RSSI \leq 7$ | RESERVED | |
| RSSI = 8 | < -91 | +8 |
| $9 \leq RSSI \leq 70$ | RSSI - 100 | $\pm 8$ FOR RSSI = 9<br>$\pm 7$ FOR RSSI = 10<br>$\pm 6$ FOR RSSI = 11<br>$\pm 5$ FOR $12 \leq RSSI \leq 59$<br>$\pm 6$ FOR $60 \leq RSSI \leq 66$<br>$\pm 7$ FOR $67 \leq RSSI \leq 68$<br>$\pm 8$ FOR $69 \leq RSSI \leq 70$ |
| RSSI = 71 | > -30 | > -8 |
| $72 \leq RSSI \leq 255$ | RESERVED | |

FIG. 6(d)

| RECEIVED SIGNAL STRENGTH RANGE INDEX (RSSRI) | ENERGY OBSERVED AT THE ANTENNA (dBm) | TOLERACE (dB) |
|---|---|---|
| 0 | ENERGY < -87 | +5 |
| 1 | -87 < ENERGY < -82 | ±5 |
| 2 | -82 < ENERGY < -77 | ±5 |
| 3 | -77 < ENERGY < -72 | ±5 |
| 4 | -72 < ENERGY < -67 | ±5 |
| 5 | -67 < ENERGY < -62 | ±5 |
| 6 | -62 < ENERGY < -57 | ±5 |
| 7 | -57 < ENERGY | -5 |

FIG. 6(e)

| OCTETS: 1 | 1 | 1 | 1 |
|---|---|---|---|
| ELEMENT ID (32) | LENGTH (2) | CHANNEL TO SWITCH | CHANNEL SWITCH COUNT |

DYNAMIC FREQUENCY SELECTION SCHEME FOR IEEE 802.11 WLANS

CROSS REFERENCE TO RELATED APPLICATIONS

This application claims the benefit of U.S. Provisional Applications Ser. No. 60/290,507 filed on May 11, 2001, the teachings of which are incorporated herein by reference.

BACKGROUND OF THE INVENTION

1. Field of the Invention

The present invention relates to a dynamic frequency selection (DFS) mechanism in an IEEE 802.11(h) wireless local area network (WLAN), wherein the operational channel of the WLAN is selected dynamically according to channel determination made by the access point (AP) based on a channel quality report.

2. Description of the Invention

The medium access control (MAC) and physical characteristics for wireless local area networks (WLANs) to support physical layer units are specified in IEEE 802.11 standard, which is defined in International Standard ISO/IEC 8802-11,"Information Technology—Telecommunications and information exchange area networks", 1999 Edition, which is hereby incorporated by reference in its entirety. The standard specifies two variants WLAN: infrastructure-based and ad-hoc type. In the former network, communication typically takes place only between the wireless nodes, called stations (STAs) and the access point (AP), not directly between the wireless nodes as in the latter network. The STAs and the AP, which are within the same radio coverage, are known as a basic service set (BSS).

When two adjacent basic service sets (BSSs) are located close to each other and operate at the same channel, which are referred to as overlapping BSSs, it is difficult to support the required quality-of-service (Qos) due to the possible mutual interference between the overlapping BSSs. In addition, other co-located systems (for example, HIPERLAN/2 device as set forth in the European Radio communications Committee (ERC) regulatory) near a particular STA, may cause reception interference. It is not always possible to avoid interference by carefully planning channel allocations to BSSs before the WLAN deployment, especially in the home/office environment where other WLAN devices are operating independently in the vicinity, for example, in the neighboring houses or offices.

Accordingly, there is a need for a dynamic frequency selection (DFS) scheme that can be incorporated into IEEE 802.11 standard, enabling the access point (AP) to select a channel for all stations (STAs) associated with its basic service set (BSS). To achieve this, the present invention introduces changes to the 802.11 Medium Access Control (MAC) and 802.11a Physical Layer (PHY) (for IEEE 802.11 WLAN operation at the 5 GHz unlicensed bands) specifications, which would allow dynamic selection of a frequency channel for the operation of the network. This would facilitate meeting the requirements imposed by the European Radio communications Committee (ERC) and it would enhance the performance of an 802.11 WLAN operation in the 5 GHz band.

SUMMARY OF THE INVENTION

The present invention is directed to a dynamic frequency selection method and system in a wireless local area network (WLAN), wherein each channel is selected dynamically according to the criteria determined by the access point (AP).

According to an aspect of the present invention, there is provided a method of dynamically selecting a communication channel between an access point (AP) and a plurality of stations (STAs) located within the coverage area of a basic service set (BSS). The method includes the steps of: determining whether a new channel to be used by the plurality of wireless STAs is needed; requesting, by the AP, a channel quality measure to at least one of the plurality of STAs; transmitting the channel quality report of a plurality of frequency channels from said requested STAs to the AP, wherein the channel quality report includes the received signal strength indication (RSSI) and Clear Channel Assessment (CCA) busy periods of all channels measured by the plurality of STAs; determining whether a signal from an adjacent BSS is received by the plurality of STAs; selecting a new channel based on the channel quality and regulatory requirements for use in communication between the AP and the plurality of STAs according to the channel quality report; communicating information about the new channel from said AP to said plurality of STAs; and, switching all STAs to the new channel.

According to another aspect of the present invention, there is provided a system of dynamically selecting a communication channel between an AP and a plurality of STAs located within the coverage area of a BSS in a WLAN. The system includes a means for determining whether a new channel to be used by the plurality of STAs is needed; a means for requesting, by the AP, a channel signal quality measure to at least one of the plurality of STAs; a means for transmitting a channel quality report of a plurality of frequency channels between the AP and at least one of the plurality of STAs, wherein the channel quality report including a received signal strength indication (RSSI) and Clear Channel Assessment (CCA) busy periods of all channels measured by the plurality of STAs; a means for determining whether a frame from an adjacent BSS is received by the plurality of STAs; a means for selecting a new channel based on the least degradation of the channel quality for use in communication between the AP and the plurality of STAs if the adjacent BSS signal or periodicity is detected; and, a means for communicating information about the new channel from the AP to the plurality of STAs.

BRIEF DESCRIPTION OF THE DRAWINGS

A more complete understanding of the method and apparatus of the present invention may be had by reference to the following detailed description when taken in conjunction with the accompanying drawings wherein:

FIG. 4 illustrates the format of a channel measurement request frame that may be used to transmit information from an AP to the STAs according to an embodiment of the present invention;

FIGS. 5(*a*)–(*b*) illustrate the format of channel measurement method information elements that may be used to transmit information from an AP to the STAs according to an embodiment of the present invention;

FIGS. 6(*a*)–(*e*) illustrate the format of channel measurement report information elements that may be used to transmit information from a plurality of STAs within a BSS to an AP according to an embodiment of the present invention;

DETAILED DESCRIPTION OF THE EMBODIMENTS

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

Figure 1:
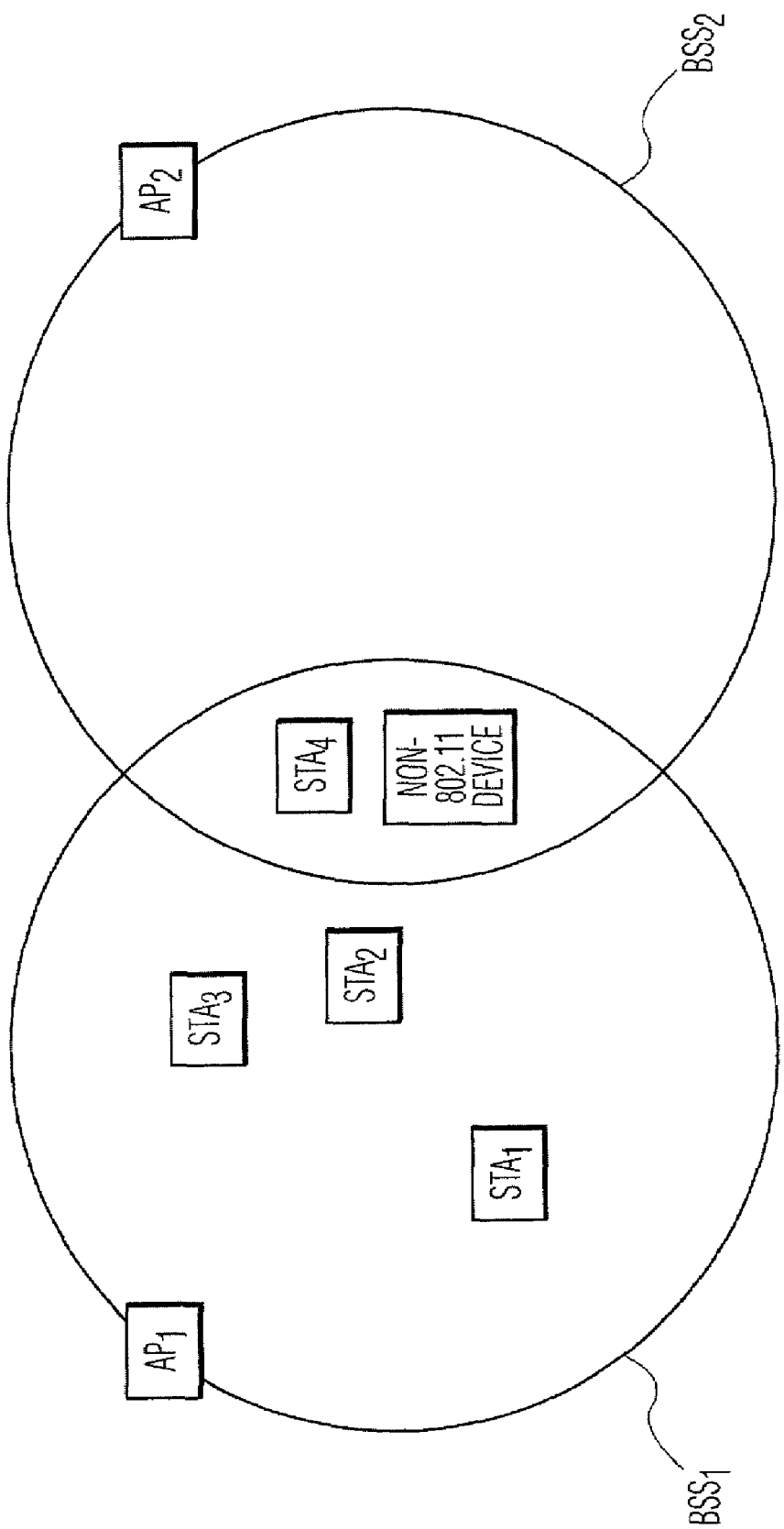
FIG. 1 illustrates the architecture of a wireless communication system whereto embodiments of the present invention are to be applied.

FIG. 1 illustrates a representative network whereto embodiments of the present invention are to be applied. According to the principle of the present invention, there is provided a dynamic frequency selection (DFS) scheme enabling an access point (AP) to select a channel based on channel quality reports for all stations (STAs) associated with its basic service set (BSS) that also reduces the interference to other co-located systems. It should be noted that the network shown in FIG. 1 is small for the purpose of illustration. In practice most networks would include a much larger number of mobile STAs.

The present invention has application to a wireless local area network (WLAN) by enabling the AP to provide a new wireless link for all stations (STAs) associated with its BSS. For example, the $STA_3$ of a $BSS_1$, may be in an overlapping region with a neighboring $BSS_2$, thus experiencing contentions from the $STA_2$ in the neighboring BSS2. Alternatively, the $STA_3$ may experience interference from a nearby non-802.11 compliant device belonging to other licensed operators such as satellites and radar systems. To this end, the present invention introduces changes to the 802.11 MAC and 802.11a PHY specifications that would enable the dynamic selection of a frequency channel for the operation of the network. This would facilitate meeting the requirements imposed by the European Radio communications Committee (ERC) and it would enhance the performance of an 802.11 WLAN operation in the 5 GHz band or other band range, i.e., 2.4 GHz. It should be apparent to those skilled in the art that this invention can be easily extended to other frequency bands, such as 2.4 GHz, using different physical layer specifications, such as IEEE 802.11b PHY specification.

Figure 2:
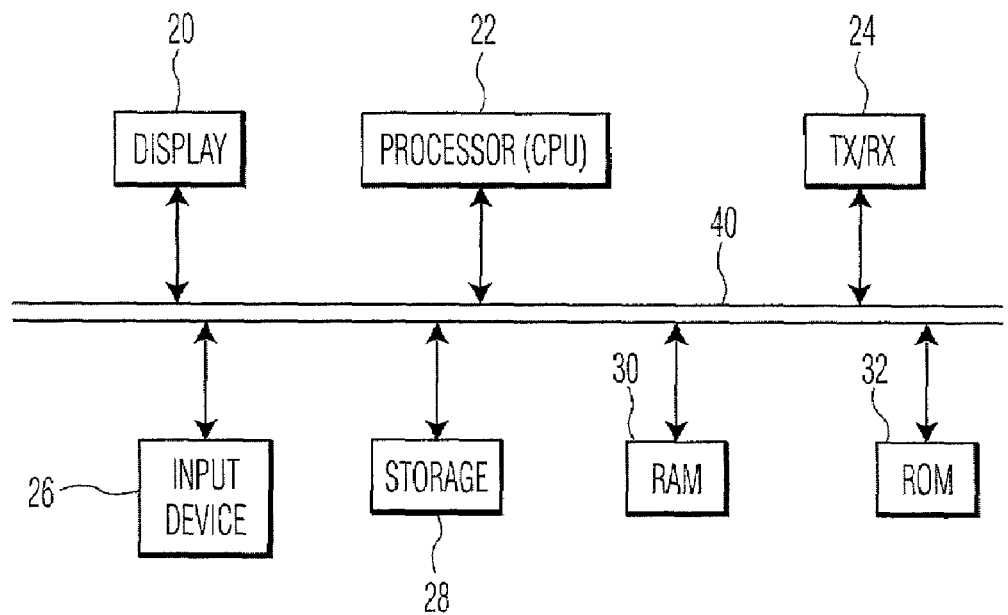
FIG. 2 illustrates a simplified block diagram of an access point (AP) and each station (STA) within a particular basic service set (BSS) according to the embodiment of the present invention.

Referring to FIG. 2, the AP and each STA within the WLAN shown in FIG. 1 may include a system with an architecture that is illustrated in the block diagram of FIG. 2. Both the AP and STA may include a display 20, a CPU 22, a transmitter/receiver 24, an input device 26, a storage module 28, a random access memory (RAM) 30, a read-only memory (32), and a common bus 40. Although the description may refer to terms commonly used in describing particular computer systems, the description and concepts equally apply to other processing systems, including systems having architectures dissimilar to that shown in FIG. 2. The transmitter/receiver 24 is coupled to an antenna (not shown) to transmit desired data and its receiver converts received signals into corresponding digital data. The CPU 22 operates under the control of an operating system contained in the ROM 32 and utilizes RAM 30 to perform the frequency selection within a wireless local area network (WLAN), by enabling the AP to provide a new channel or wireless link for all stations (STAs) associated with its BSS.

Now, the principle of operation steps according to the present invention in selecting a new channel for all stations (STAs) by the AP is explained hereafter.

Figure 3:
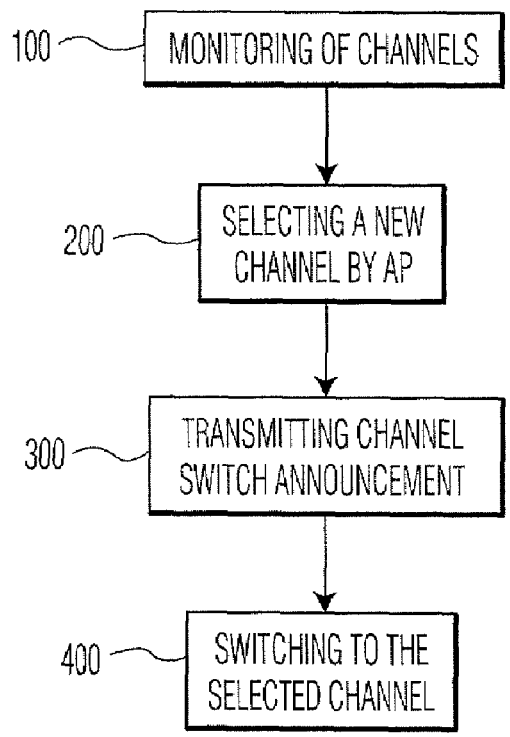
FIG. 3 is a flow chart illustrating the operation steps for selectively switching to a new channel according to an embodiment of the present invention.

Referring to FIG. 3, the inventive steps include the following steps: monitoring of channels 100; selecting a new channel by AP 200; transmitting channel switch announcement 300; and, switching to the selected channel 400. The monitoring of channels 100 includes three substeps of (1) channel measurement by AP; (2) request for channel measurement by AP; and, (3) measurement report by STAs.

Monitoring of Channels (step 100 of FIG. 3)

Channel monitoring can be initiated if one of the following events (but not necessarily limited to) occurs: (1) a particular basic-service-set (BSS) is newly formed by an AP (step 401); (2) the AP operates a given BSS without any associated STA for a certain period of time; (3) the AP and/or one or more STAs in a BSS experiences a poor communication channel persistently; and, (4) the overlapping of BSSs occurs causing a channel interference; (5) detection of other licensed operators. If any of these events occurs, the AP may dynamically select a new wireless link to operate its BSS. Hence, prior to making a switch to the best wireless link, the AP needs to know the status of the current and other channels as well as the presence of other licensed operators, by detecting the channel conditions directly or by requesting the channel conditions from the associated STAs.

(1) Channel Measurement by AP

In the event that the AP directly performs the channel measurement, the measurement is performed in such a way that the service disruption can be minimized. This can be achieved by measuring the channel quality during a contention free period (CFP) or during a contention free burst (CFB). The CFP is part of the current 802.11 standard while the CFB is expected to be part of the upcoming 802.11e standard. The CFP and CFB are useful as the AP is designed to be ready to receive frames at all times, unless it is transmitting a frame. In operation, by announcing aCFMax-Duration, which is larger than the value needed to support the Quality-of-Service (QoS) polls/transmission within, the AP can measure the current channel and/or other channels during this residual period. The CFB can be used in a similar manner in the 802.11e compliant WLAN. That is, during a contention period (CP), the AP can initiate a CFB by polling itself (i.e., sending a QoS CF-Poll addressed to itself.) During the CFB period determined by the duration field found in the QoS CF-Poll, all the STAs shall keep silent, and the AP can measure the current channel and/or other channels during this period. Alternatively, the AP can use the Clear-to-Send (CTS) frame to measure the channel, without service interruption. By sending a CTS frame with the self-address as the receiver address (RA), the AP can force all the STAs, which receive this CTS frame, to keep silent for a specified period during which the AP can measure the channel.

(2) Request for Channel Measurement by AP

In the event that the AP requests a channel measurement to a set of STAs associated with its BSS, the AP transmits a channel measurement request frame, as shown in FIG. 4. The transmission of a request for channel quality measurement to the STAs can be unicast, multicast, or broadcast. The request frame will specify (1) when to begin the measurement; (2) which channel to measure; (3) how long to measure; and, (4) how to measure. As shown in FIG. 4, the channel measurement frame contains four fields: "Action Code," "Activation Delay," "Dialog Token," and "Channel Measurement Method element." The "Activation Delay" field specifies when to start the channel measurement procedure. The "Dialog Token" is a single octet field, which distinguishes different measurement requests from each other. The "Channel Measurement Method element" field indicates a set of channels to be measured, in which each octet specifies a channel number, and can be one of two forms: "basic channel measurement method" or "CF channel measurement method," as shown in FIGS. 5(a) and 5(b).

Referring to FIG. 5(a), the "basic channel measurement frame" contains three fields in addition to "Element ID" and "Length" fields: "Measurement Duration," "Channel Numbers," and "Report Time Limit." The "Measurement Duration" ($\geq 0$) field indicates the duration of each channel measurement performed by the requested STA. The "Channel Number" field indicates a set of channels to be measured, in which each octet specifies a channel number. The "Report Time Limit" ($\geq 0$) field indicates the time duration in which the requested STA should report the measurement result back to the AP.

Referring to FIG. 5(b), the "CF Channel Measurement frame" contains five fields in addition to "Element ID" and "Length" fields: "Measurement Duration," "Measurement Offset," "Non-Measurement Duration," "Channel Numbers," and "Report Time Limit." The "Measurement Duration" ($\geq 0$) field indicates the time duration, in the number of contention free period (CFP) repetition intervals (CFPRI's), which the requested STA spends for the measurement of each channel. The "Measurement Offset" and the "Non-Measurement Duration" fields represent the time period out of each CFPRI, which the requested STA should not be away from the current channel for the measurement of a remote channel. For example, during a CFPRI[0,CFPRI], starting from the target beacon transmission time (TBTT), at which a CFP starts, the STA is to be away from the current channel for the measurement of a remote channel, except for the period [CFPRI*MO/256, CFPRI*(MO+NMD)/256], where MO represents the value of "Measurement Offset," and NMD represents the value of "Non-Measurement Duration," respectively. The "Channel Number" field indicates a set of channels to be measured, in which each octet specifies a channel number. The "Report Time Limit" ($\geq 0$) field indicates the time duration in which the requested STA should report the measurement result back to the AP.

(3) Measurement Report by Stations (STAs)

Upon receiving a request to measure a channel by the AP as described in the preceding paragraphs or when measured voluntarily, each STA will transmit a channel measurement report frame. FIG. 6(a) illustrates the format of the channel measurement report frame. It is noted that the channel measurement report frame can be transmitted without being requested by the AP via the channel measurement request frame. In such a case, the value of the "Dialog Token" field will be set to zero.

In general, the channel measurement report frame will contain the following three forms: (i) detection of other BSSs; (ii) measurement of Clear Channel Assessment (CCA) busy periods; and, (iii) measurement of received signal strength statistics.

(i) Detection of Other BSSs

The detection of other BSSs in the requested frequency channel could be performed using the existing MAC sublayer management entity (MLME) service known as "scan" service and/or its variant. This service is requested by the station management entity (SME) residing within each STA to the MLME via a management primitive MLME-SCAN.request in order to request the detection of existing BSSs in a number of channels. Thereafter, the primitive MLME-SCAN.confirm returns the scan results to the SME, including the complete description of all the BSSs found. It is noted that this service is originally defined in the 802.11 in order for a STA to survey potential BSSs that the STA may later elect to perform the handoff. If a BSS is detected, the STA specifies if a frame with "To DS" (if the frame is sent in the direction to the AP) and/or "From DS" (if the frame is sent from the AP) fields set and/or beacon frames were received.

(ii) Measurement of CCA Busy Periods

In addition, the measurement of noise or interference level by 802.11 non-compliant devices, e.g., ETSI BRAN HIPERLAN/2 devices or satellite systems, is detected and reported to the AP. The existence of such a device is detectable not as a BSS, but as a co-channel interference.

The STA shall keep track of the CCA busy periods in order to report back the fractional period during which the CCA was busy out of the whole measurement duration. Note that CCA shall be indicated busy by (1) the start of a valid OFDM transmission at a receiver level $\geq -82$ dBm with a probability $>90\%$ within 4 usec, and (2) any signal above 62 dBm. Therefore, the fractional period can be non-zero even when no BSS is detected.

A STA shall also attempt to determine the characteristics of the periodic burst by keeping track of the following information. Each STA can keep track of the number of consecutive CCA busy periods observed where each busy period is defined as a CCA busy indication during one slot time. At the same time, each STA can keep track of non-zero intervals in Slot Times between the successive busy periods, such that if these two parameters consecutively match two or more times, with some tolerance, then the detected signal may be construed as coming from a periodic source (some non-802.11 compliant devices exhibit periodic characteristics) and reported to the AP, as shown in FIG. 6(b). In addition, if two or more consecutive busy and idle periods match with some tolerance then it could indicate presence of radar type signals and this information is conveyed to AP.

FIG. 6(b) illustrates the format of a channel measurement report information element that is used by an STA to report the channel quality measurement back to the AP in accordance with the present invention. As shown in FIG. 6(b), the length of the frame depends on the number of channels. Referring to FIG. 6(c), a one-octet "Measurement Summary" field includes a BSS field for specifying that at least one valid MAC Header was received during the channel measurement; the "QBSS" field specifies that at least one BSS is running in QBSS of 802.11e-compliant WLAN, and this bit can be set only if the STA reporting is 802.11e MAC enabled; the "Periodicity" field indicating that at least two consecutive CCA busy on/off patterns were periodic; the "Beacon" field specifying that at least one beacon was received during the measurement; and, "To DS" (or "To AP") and "From DS" (or "From AP") fields specifying that at least one frame with the "To DS" field and the "From DS"

field were received during the measurement, respectively. The Channel Measurement Report Information element further includes the "Own AP Transmitted Power" field, which is copied from the four bits of "Transmitted Power" in the SERVICE field of the Measurement Request frame from the AP, and the "Own Channel Received Signal Strength Indicator (RSSI)" field, which represents the energy observed at the antenna used to receive the PLCP preamble of the said Measurement Request frame from the AP, and is encoded according to FIG. 6(d); "CCA Busy Fraction" field for specifying the fractional time during which the CCA was busy which is calculated according to the following equation: CCA Busy Fraction=Ceiling (255×[CCA Busy Period]/[Total Measurement Duration in the Channel]); the "CCA Busy Duration" field indicating the number of consecutive time slots the CCA busy was detected.; and, the "CCA Busy Interval" field representing the time interval in time slots of repeating CCA Busy indicators. Both the "CCA Busy Duration" and "CCA Busy Interval" fields are valid only if "Periodicity" is set in the Measurement Summary field.

(iii) Measurement of Received Signal Strength Statistics

Furthermore, measurements of the strength of the received signal, which may be used to determine the channel condition, is reported to the AP, as shown in FIGS. 6(d) and 6(e). Referring to FIG. 6(e), a parameter called received signal strength range index (RSSRI), which ranges from 0 through 7,is used to indicate the energy level observed at the antenna of each station. Depending on the value of the 'BSS' field in FIG. 6(b), the 4-octet Received Signal Strength Range Index (RSSRI) Statistics field will represent two different measurement results/indicators. When BSS field is set, i.e., one, it represents the statistics of the energy level measured during the reception of the PLCP preamble for each received frame, while when it is not set, i.e., zero, it represents the statistics of the instantaneous energy level observed at the antenna. It is sampled periodically.

Each octet of the RSSI Statistics field is represented as follows:

| Bits: 3 | 5 |
|---|---|
| RSSRI | Density |

The 3-bit Received Signal Strength Range Index (RSSRI) is defined as shown in FIG. 6(e) as a function of:
(1) the energy level observed during the reception of the PLCP preamble of a received frame in case of BSS field set, i.e., one, or
(2) an instantaneous energy level observed at the antenna in case of BSS field not-set, i.e., zero.

The STA during the frequency channel measurement keeps track of the number of measured samples corresponding to each RSSRI. 5-bit Density field is defined by:

Density (RSSRI)=Ceiling (31×[Number of samples corresponding to the RSSRI]/[Total Number of Samples])

Four RSSRI's with the largest Density values will be chosen, and will be included in RSSRI Statistics field.

Decision by AP (step 200 of FIG. 3)

After obtaining the channel quality reports in step 100, the AP now determines a new channel that is used for communication between the AP and the STAs. A method of selecting the new channel in accordance with this invention is shown in the flow diagram of FIG. 7.

In step 8, the process of selecting a channel from support channels is initiated. Then, it is determined whether the presence of another BSS is detected by each STA based on the received signal thereto in step s10. If not detected, it is determined whether the periodicity of a received signal is detected in step s12. If periodicity is detected, the corresponding channel is excluded from a candidate channel list in step s14. Here, the candidate channel list contains channel numbers that the AP may consider switching all STAs for communication.

Meanwhile, if another BSS is detected in step s10, it is determined whether the "From DS" field is set in step s16. If so, the corresponding channel is excluded from a candidate channel list in step s18 as the interference from the AP in another BSS is highly undesirable. If the "From DS" field is not set in step s16 or if the periodicity is not detected in step s12, then the AP includes them in the candidate channel list in step s20. Thereafter, it is determined whether all channels are scanned in step 22. If so, the channel with the least RSSRI and/or CCA value is selected.That is, after obtaining a number of potential candidate channels, the AP may determine a specific channel with the least interference to, not only to other STAs with a BSS, but to other co-located systems, e.g., HIPERLAN/2 devices. Lastly, the AP determines the channel selected in step s24 as a new channel to which all STAs must switch.

Channel Switch Announcement by AP (step 300 of FIG. 3)

Figures 7, 8:
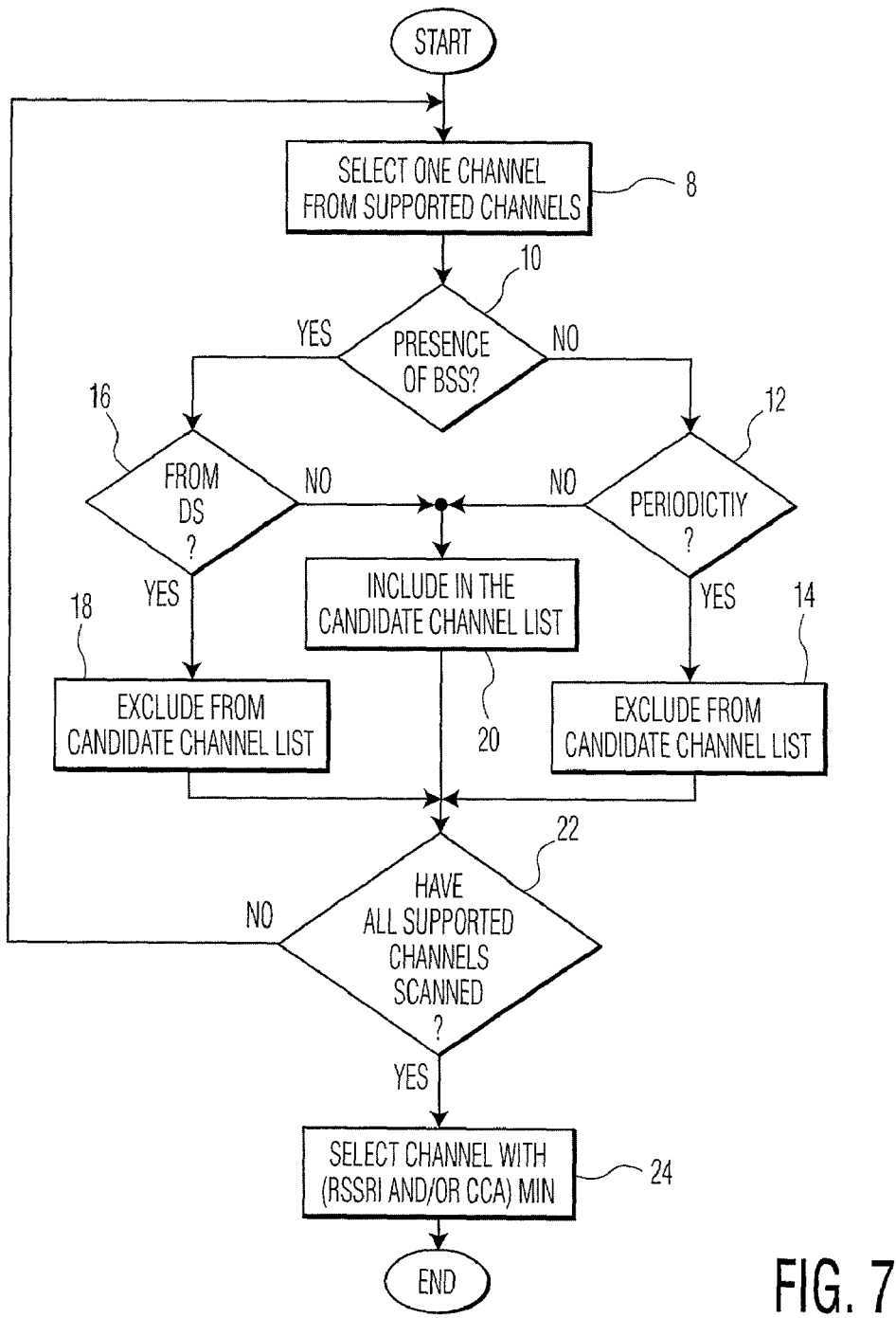
FIG. 7 is a flow chart illustrating the process of determining a new channel by the AP based on a channel quality report according to an embodiment of the present invention; and, FIG. 8 illustrates the format of a frame body that is used to transmit announcement data from an AP to a plurality of STAs according to an embodiment of the present invention.

After selecting a new channel to switch to, the AP transmits the new channel information via beacon transmission to switch all the STAs to the selected channel based on the channel measurement received from the STAs associated with this particular BSS as well as its own measurements. The AP will transmit beacon frames repeatedly with the information indicating when and to which channel the switch would be performed. FIG. 8 depicts an announcement frame that can be used for this channel switch announcement and contains the "Channel-to-Switch" representing the number of frequency channel to make the switch to and the "Channel Switch Count" representing how many beacons (including the current frame) should appear before the channel switch when the BSS occurs.

Switching to the New Channel (step 400 of FIG. 3)

Finally, the movement into a new channel is performed by changing the carrier frequency of a 802.11a OFDM PHY. In the embodiment, the switching is preferably to occur immediately before a target beacon transmission time (TBTT) by both all STAs and the AP.

As is apparent from the foregoing, the present invention has an advantage in that a dynamic frequency selection (DFS) mechanism can be obtained with some minor modification in the current 802.11 specifications. It should be noted that although the present disclosure is confined to the infrastructure-based 802.11 WLANs with an AP as a centralized decision-maker of the DFS within a BSS, the present invention can be easily extended to support the ad hoc mode of WLANs.

Having thus described a preferred embodiment of a dynamic frequency selection (DFS) method for determining a channel for use within a WLAN system, it should be apparent to those skilled in the art that certain advantages of the system have been achieved. The foregoing is to be constructed as only being an illustrative embodiment of this invention. Persons skilled in the art can easily conceive of alternative arrangements providing a functionality similar to this embodiment without any deviation from the fundamental principles or the scope of this invention.

What is claimed is:

1. A method for dynamically selecting a communication channel between an access point (AP) and a plurality of stations (STAs) located within the coverage area of a basic service set (BSS) in a wireless local area network (WLAN), the method comprising the steps of:
   (a) determining whether a new channel to be used by all of the plural STAs is needed;
   (b) measuring a channel quality of a plurality of frequency channels by an STA of the plural STAs;
   (c) reporting from said STA to said AP of a list of candidate channels including a received signal strength indication (RSSI) and Clear Channel Assessment (CCA) busy periods of channels measured by said STA; and,
   (d) selecting one of said candidate channels based on said channel quality report for use in communication between said AP and the plural STAs.

2. The method of claim 1, wherein said channel signal quality further includes an interference signal level caused by another communication device, said interference signal level is based on a periodic presence of on/off busy CCA signals.

3. The method of claim 1, wherein said step (d) of selecting one of said candidate channels is based on the least interference to said channel quality or meeting other regulatory requirements for use in communication between said AP and said plural STAs.

4. The method of claim 1, wherein said step (d) of selecting one of said candidate channels is based on whether the channel causes the least interference to another communication device or meeting other regulatory requirements.

5. The method of claim 1, further comprising the step of transmitting the selected channel information to said plural STAs by said AP.

6. The method of claim 1, further comprising the step of switching said plural STAs to said new channel.

7. The method of claim 1, further comprising the step of (e) notifying said plural STAs of the selected channel by beacon transmission to switch all of said plural STAs to said selected channel.

8. A method for dynamically selecting a communication channel between an access point (AP) and a plurality of stations (STAs) located within the coverage area of a basic service set (BSS) in a wireless local area network (WLAN), the method comprising the steps of:
   (a) determining whether a new channel to be used by all of the plural wireless STAs is needed;
   (b) requesting, by said AP, a channel quality measure to at least one of the plural STAs;
   (c) transmitting a channel quality report of a plurality of frequency channels from said at least one of the plural STA to said AP, said channel quality report including a received signal strength indication (RSSI) and Clear Channel Assessment (CCA) busy periods of channels measured by said plural STAs;
   (d) determining whether a signal from an adjacent BSS is received by an STA of said plural STAs; and,
   (e) if said adjacent BSS signal or an interfering signal of unknown type is detected, selecting a new channel based on least interference to said channel quality or meeting other regulatory requirement for use in communication between said AP and said plural STAs according to the value of said RSSI.

9. The method of claim 8, further comprising the step of communicating information about said new channel from said AP to said plural STAs.

10. The method of claim 8, wherein said new channel is selected if said RSSI does not exceed a predetermined threshold.

11. The method of claim 8, further comprising the steps of:
   determining whether an interference signal level caused by another communication device is detected based on a periodic presence of on/off busy CCA signals; and, if so, selecting said new channel based on whether the channel, among candidate channels, causes least interference to said communication device.

12. The method of claim 8, wherein it is determined that said new channel is needed in step (a) by determining, for the following conditions, if any occurs: (1) said BSS is formed by said AP; (2) said AP or said STA experiences a bad channel condition; (3) said BSS overlaps with an adjacent BSS; (4) no association of said STA by said AP occurs longer than a predetermined time period; and, (5) detection of another licensed operator within said BSS.

13. A method for dynamically selecting a communication channel between an access point (AP) and a plurality of stations (STAs) located within a coverage area of a basic service set (BSS) in a wireless local area network (WLAN), the method comprising the steps of:
   (a) determining whether a new channel to be used by all of the plural STAs is needed;
   (b) determining whether a signal from an adjacent BSS is received by said plural STAs;
   (c) measuring a received signal strength indication (RSSI) and Clear Channel Assessment (CCA) busy periods of all said channels scanned by said plural STAs to said AP;
   (d) measuring an interference level caused by another communication system based on a periodic presence of on/off busy CCA signals; and
   (e) selecting said new channel representing the least interference signal level based on said measured RSSI, CCA, and periodic presence of CCA busy signals.

14. The method of claim 13, further comprising the step of communicating information about said new channel from said AP to said plural STAs.

15. The method of claim 13, further comprising the step of switching said plural STAs to said new channel.

16. The method of claim 13, wherein determining that said new channel is needed in step (a) if one of the following condition occurs: (1) said BSS is formed by said AP; (2) said AP or said STA experiences a bad channel condition; (3) said BSS overlaps with an adjacent BSS; (4) no association of said STA by said AP occurs longer than a predetermined time period; and, (5) detection of another licensed operator within said BSS.

17. A system for dynamically selecting a communication channel between an access point (AP) and a plurality of stations (STAs) located within the coverage area of a basic service set (BSS) in a wireless local area network (WLAN), the system comprising:
   means for determining whether a new channel to be used by all the plural STAs is needed;
   means for requesting, by said AP, a channel signal quality measure to at least one of said plural STAs;
   means for transmitting a channel quality report of a plurality of frequency channels between said AP and at least one of said plurality of STAs, said channel quality report including a received signal strength indication (RSSI) and Clear Channel Assessment (CCA) busy periods of all channels measured by said plural STAs;

means for determining whether a signal from an adjacent BSS is received by said plural STAS; and, means for selecting a new channel based on the least interference to said channel quality for use in communication between said AP and said plural STAs if said adjacent BSS signal is detected.

18. The system of claim 17, further comprising a means for communicating information about said new channel from said AP to said plural STAs.

19. The system of claim 17, further comprising a means for switching said plural STAs to said new channel.

20. The system of claim 17, wherein said new channel is selected if said RSSI exceeds a predetermined threshold.

21. The system of claim 17, further comprising:

means for determining whether an interference signal level caused by another communication device is detected based on a periodic absence of any 802.11 frame reception for a predetermined time period; and, means for selecting said new channel based on whether the channel causes the least interference to another communication device.

22. A system for dynamically selecting a communication channel between an access point (AP) and a plurality of stations (STAs) located within the coverage area of a basic service set (BSS) in a wireless local area network (WLAN), the system comprising:

a memory for storing a computer-readable code; and, a processor operatively coupled to said memory, said processor configured to:

(1) determine whether a new channel to be used by all of the plural STAs is needed;

(2) determine whether a signal from an adjacent BSS is received by said plural STAs;

(3) measure a received signal strength indication (RSSI) and Clear Channel Assessment (CCA) busy periods of all said channels scanned by said plurality of STAs to said AP;

(4) measure an interference level caused by another communication system based on a periodic absence of any 802.11 frame reception for a predetermined time period; and, (5) select said new channel representing the least interference signal level based on said measured RSSI, CCA, and periodic presence of CCA busy signals.

23. The system of claim 22, wherein said processor is further configured to communicate information about said new channel from said AP to said plural STAs.

24. The system of claim 22, wherein said processor is farther configured to switch said plural STAs to said new channel.

25. A method for dynamically selecting a communication channel between an access point (AP) and a plurality of stations (STAs) located within the coverage area of a basic service set (BSS) in a wireless local area network (WLAN), the method comprising the steps of:

(a) determining whether a new channel to be used by said plurality of wireless STAs is needed;

(b) requesting, by said AP, a channel quality measure to at least one of said plurality of STAs;

(c) transmitting a channel quality report of a plurality of frequency channels from said at least STA to said AP, said channel quality report including a received signal strength indication (RSSI) and Clear Channel Assessment (CCA) busy periods of all channels measured by said plurality of STAs;

(d) determining whether a signal from an adjacent BSS is received by said plurality of STAs;

(e) if said adjacent BSS signal or interfering signals of unknown type is detected, selecting a new channel based on the least interference to said channel quality or meeting other regulatory requirement for use in communication between said AP and said plurality of STAs according to the value of said RSSI; and switching said plurality of STAs to said new channel.

* * * * *